United States Patent Office 3,012,954
Patented Dec. 12, 1961

---

3,012,954
ARC PROCESS AND APPARATUS FOR CHLORINATION OF ZIRCONIUM OXIDE AND THE LIKE
Frederick Fahnoe, Ashtabula, Ohio, assignor to Reactive Metals Inc., a corporation of Delaware
Filed Aug. 31, 1959, Ser. No. 837,272
9 Claims. (Cl. 204—164)

The invention relates to a novel process and apparatus for the preparation of volatile chlorides from the proper oxide or silicate, and more particularly to such process and apparatus in which the oxide or silicate in finely divided form, combined with finely divided carbon, is fed in stream with chlorine gas through a hollow anode, to the arc of an arc furnace.

Although the invention is disclosed herein as applied to the preparation of $ZrCl_4$ from zirconium oxide, it is applicable for the preparation of other volatile chlorides, for example, beryllium chloride, tantalum chloride and columbium chloride from the proper oxide or silicate.

Under present practice, a briquette-chlorination process is commonly used for producing $ZrCl_4$ from zirconium oxide. In such prior practice the raw feed material consists of zirconium oxide from which the hafnium has been removed. The route for hafnium removal utilizes solvent extraction of the soluble basic chlorides by a thiocyanate-methyl isobutyl ketone solvent process. The zirconium values from this extraction are contained in an aqueous raffinate and are recovered by precipitation as hydroxide or hydrous oxide. This precipitate when calcined gives a resultant oxide which is extremely fine in particulation, averaging about 85%—400 mesh.

This zirconium oxide is combined with finely divided carbon and briquetted, using a sugar solution as a binder. Such briquettes are then chlorinated in a shaft-type chlorinator with an electrical resistance to provide the deficient heat of reaction.

Considerable difficulty has been encountered in this practice, as it has been found particularly difficult to obtain hard, dense briquettes which would not substantially disintegrate to powder in the chlorinator. This powdering of the briquettes gives rise to excessive channeling in the shaft-type chlorinator, resulting not only in low chlorine efficiency (averaging 60%) but also in inordinately short chlorinator life (3–6 months).

In attempts to increase the life of the chlorinator and achieve better ultilization of raw materials, the use of other binders than sugar has been investigated, in an effort to produce better briquettes. Binders such as pitch and resin have been investigated, but it was found that large amounts of pitch or resin, the order of 25% by weight, were required in order to bond the finely particulated oxide.

Such an amount of pitch or resin must necessarily be completely calcined at temperatures above 1000° F., in order to be at all useable in the chlorinator, since complete calcination is mandatory in order to avoid excessive chlorine loss which would occur if any bonded hydrogen is left in the briquettes.

The use of such binders for briquetting was thus found to be prohibitive, since it would entail a large investment in additional equipment such as mixers, furnaces, calcinators and chilling equipment, which would materially increase the cost of production of the chloride.

I have, therefore, considered a radically different approach to the chlorination process, which eliminates the briquetting operation and instead takes advantages of the finely particulated zirconium oxide which is available. I, therefore, conceived that the chlorination reaction could be carried out as a powder-flame reaction with the reactants, zirconium oxide and carbon, aspirated into chlorine gas and burned in air as a flame in accordance with the two following reactions:

(1) $\quad ZrO_2 + 2C + Cl_2 \rightarrow ZrCl_4 + 2CO$
(2) $\quad 2CO + O_2 \rightarrow 2CO_2$ Reaction (1) is endothermic up to a temperature of 1650° F., whereas reaction (2) is exothermic but dependent upon reaction (1) for a source of fuel. Thus, if heat losses can be avoided, both reactions will proceed quantitatively. However, if the heat loss from the reaction vessel exceeds the net thermal output of the combined reactions, less than quantitative conversion will occur.

On the other hand, if the reactants are introduced at a temperature of 1650° F., reaction (1) will always initiate and remain self-sustaining. In accordance with the invention, the heat of an electric arc is utilized as an igniter to provide this amount of heat, and the heat loss from the reactor is then balanced by further combusting a portion of the carbon monoxide reaction product with additional air as in reaction (2).

Quantitative conversion of carbon monoxide to carbon dioxide is not desired since a reducing atmosphere must be maintained within the chlorinator to prevent the reverse reaction:

$$ZrCl_4 + O_2 \rightarrow ZrO_2 + Cl_2$$

from occurring.

The conduct of chemical reactions in an electric arc is not new. It is known that processes have been proposed for quantitatively converting refractory oxides such as silica, beryllia, and the like, to the volatile halide by heating the oxide in an arc in a chlorine atmosphere.

Such processes, however, provide for the introduction of oxide as a core in a carbon electrode which is then consumed in an electric arc operating in the high intensity region where rapid consumption of the anode occurs.

My process to which the present invention pertains fundamentally differs from such prior art processes in that the reactants are introduced in a finely particulated form with chlorine through the core of a hollow electrode, or passed through an electrode discharge while the arc is operated in a low intensity region where electrode consumption is slow.

The electrode carbon thus is not a component part of the reaction, but serves only as an instrument for providing the necessary heat to bring the reactants to a proper thermodynamic heat level.

It is therefore a primary object of the invention to provide an arc process for chlorination of zirconium oxide and the like by carrying out the chlorination reaction as a powder-flame reaction with the reactants, zirconium oxide and carbon, aspirated with chlorine gas and burned in air as a flame.

Another object of the invention is to provide a process which consists in feeding finely divided zirconium oxide and carbon, in a stream of chlorine gas, through the core of a hollow carbon anode to an arc furnace.

Conditions for transport of the desired solids in a gas stream are set in excess of the minimum transport velocity as defined by Zenz, Petroleum Refiner 36, 6, 133–142 (1957).

A further object of the invention is to provide such a process in which a major portion, say substantially two-thirds of the chlorine is added at high pressure through a venturi to effect a negative pressure on the solids feeder leg, while a minor portion, say one-third of the chlorine is added to the feeder leg at low pressure to act as a transport agent for the solids feed.

Another object is to provide such a process in which heat loss from the reaction flame by reduction is avoided by controlling the operation in an atmosphere which provides somewhat less than stoichiometric oxygen for combustion.

And finally it is an object of the invention to provide novel apparatus in which the process may be performed.

The above and other objects, apparent from the drawing and following description, may be attained, the above described difficulties overcome and the advantages and results obtained, by the apparatus, constructions, arrangements, methods, steps, procedures, modes of operation, combinations, subcombinations and parts which comprise the present invention, a preferred embodiment of which, illustrative of the best mode in which applicant has contemplated applying the principle, being set forth in detail in the following description and illustrated in the accompanying drawing.

In general terms, the invention may be briefly described as comprising a method for arc chlorination of finely particulated zirconium oxide and the like, which consists in feeding metered amounts of finely divided zirconium oxide and carbon into a chlorine aspiration system operating under slight negative pressure at the feed points, which adds sufficient chlorine to form a stable gas-solids fluid for addition to a reactor.

Approximately one-third of the chlorine is added to the solids feeder leg at low pressure to act as a transport agent for the solids feed, and approximately two-thirds of the chlorine is added at high pressure through a venturi to effect a negative pressure on the solids feeder leg.

The stream of fluidized reactants are then fed preferably through a hollow graphite anode into an arc of an arc furnace provided with a cathode cooperating therewith to produce an arc. The cathode feed is set at a fixed rate determined by electrode erosion, and the anode feed is maintained by voltage control.

At the current loading used, the arc will operate at near maximum of the low intensity range, at which point electrode erosion is minimum while maintaining good arc stability. The heat input of the arc is equivalent to that necessary to heat the reactants to a temperature at which the chlorination reaction becomes exothermic.

The reaction then becomes a flame-type reaction with the arc as the source and igniter. To avoid heat loss from the reaction flame by radiation, the operation is preferably conducted in an air atmosphere which provides somewhat less than stoichiometric oxygen for combustion. Thus some of the product carbon monoxide is combusted and the heat of this reaction provides a confining hot mantle of gas around the primary chlorination reaction flame. The gaseous reactor products are withdrawn from the top of the arc furnace and may be handled as under present practice by passing through cyclones and into condensers for collection.

Having thus briefly described the invention, reference is now made to the accompanying drawings showing a preferred embodiment of apparatus in which the novel process may be performed, in which;

FIG. 3 is an enlarged longitudinal section of the venturi forming a part of the chlorination aspiration system.

Figure 1:
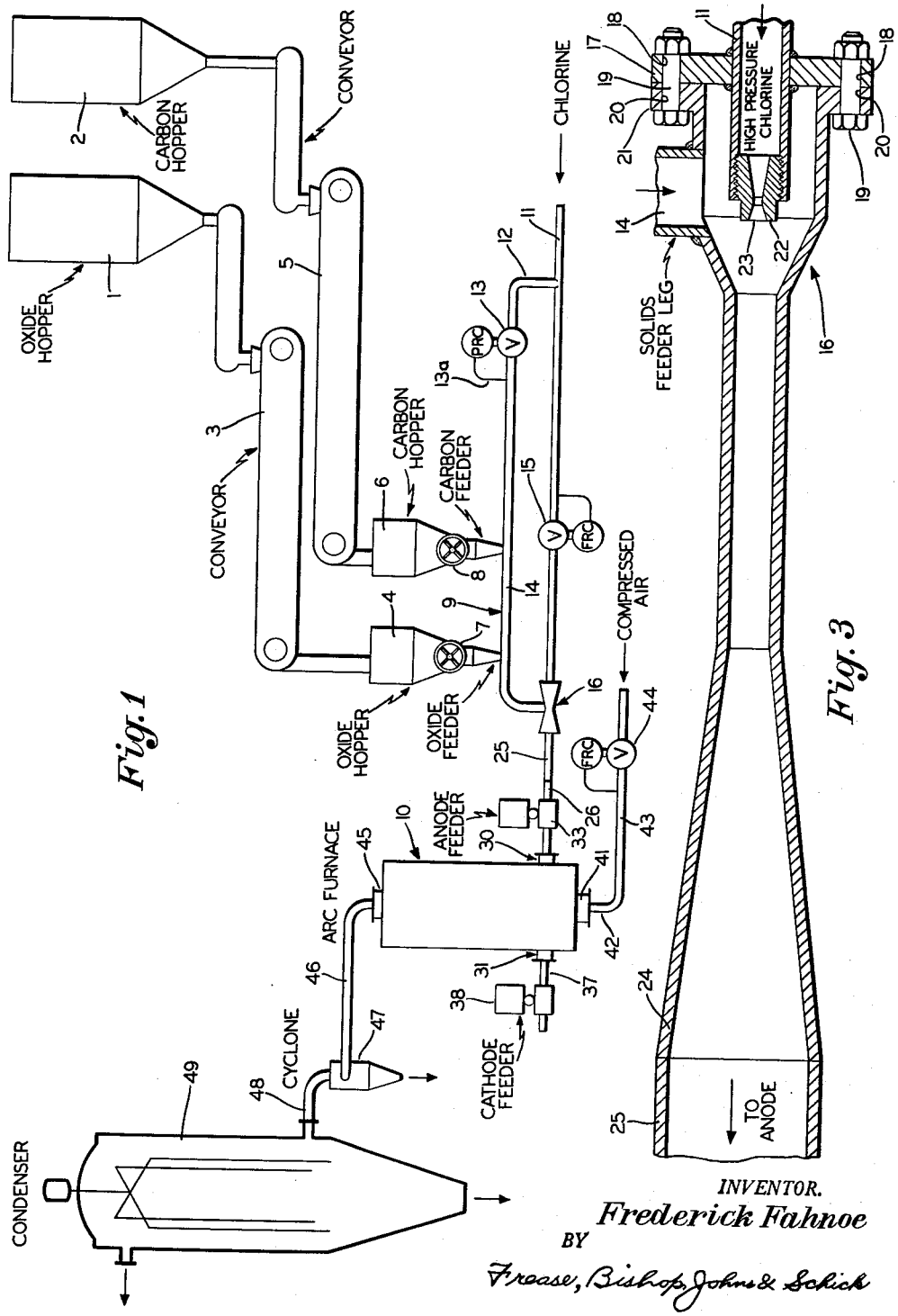
FIG. 1 is a diagrammatic view showing the apparatus by means of which measured amounts of oxide and carbon are metered into a chlorine aspiration system and fed in stream to an arc furnace.

Referring now more particularly to the embodiment of the invention illustrated in the drawings, in which similar reference characters refer to like parts throughout, zirconium oxide or the like and carbon in finely particulated or powdered form, are contained in storage hoppers 1 and 2 respectively.

For the purpose of the invention powdered zirconium oxide, or the like, is conveyed continuously from the oxide storage hopper 1 by a conveyer 3, preferably a Redler-type conveyer, to a small oxide feed hopper 4.

In like manner, powdered furnace-grade carbon is conveyed continuously from the carbon storage hopper 2, by a conveyer 5, which also may be a Redler-type conveyer, to the small carbon feed hopper 6.

The powdered oxide and carbon are metered in proper proportions from the feed hoppers 4 and 6 by the rotary feeders 7 and 8 respectively, to a chlorine aspiration system indicated generally at 9, which aspiration system operates under slight negative pressure at the feed points.

This aspiration system will add 110% of the theoretical chlorine to form a stable gas-solids fluid for addition to the reactor arc furnace indicated generally at 10. The design of the aspiration system requires chlorine under about 60 p.s.i.g. pressure to maintain a stable fluid-solids flow.

Chlorine gas at high pressure is admitted from a suitable source of supply through the pipe 11 to the aspiration system. A branch pipe 12 communicates with the main chlorine pipe 11 and leads through an automatic recording pressure control valve 13 to the solids feeder leg 14, for admitting approximately one-third of the chlorine at low pressure to the feeder leg to act as a transport agent for the solids feed. Sensing connections to operate the automatic valve are shown at 13a and indicate the point from which the signal is taken.

Approximately two-thirds of the chlorine from the pipe 11 passes through the recording flow control valve 15 and added at high pressure through the venturi, indicated generally at 16, to effect a negative pressure on the solids feeder leg.

The venturi is shown in detail in FIG. 3. The chlorine pipe 11 has a flange 17 formed thereon and provided with suitable openings 18 to receive bolts 19 which are located through similar openings 20 in the flange 21 at the closed end of the venturi. The pipe 11 projects a short distance into this end of the venturi, to a point just below the point of communication of the feeder leg 14 therewith, and has the pipe plug nozzle 22 located in its inner end and provided with a nozzle opening 23 flared oppositely in both directions from the center. The large open end 24 of the venturi is connected to pipe 25 which communicates with the hollow graphite anode 26 of the reactor arc furnace 10.

Inasmuch as the design is based upon a fluid-solids velocity in excess of the transport velocity of the contained solids, the connection between pipe 25 and the graphite anode 26 may be of flexible construction to facilitate rapid transfer as electrode replacement is required.

Figure 2:
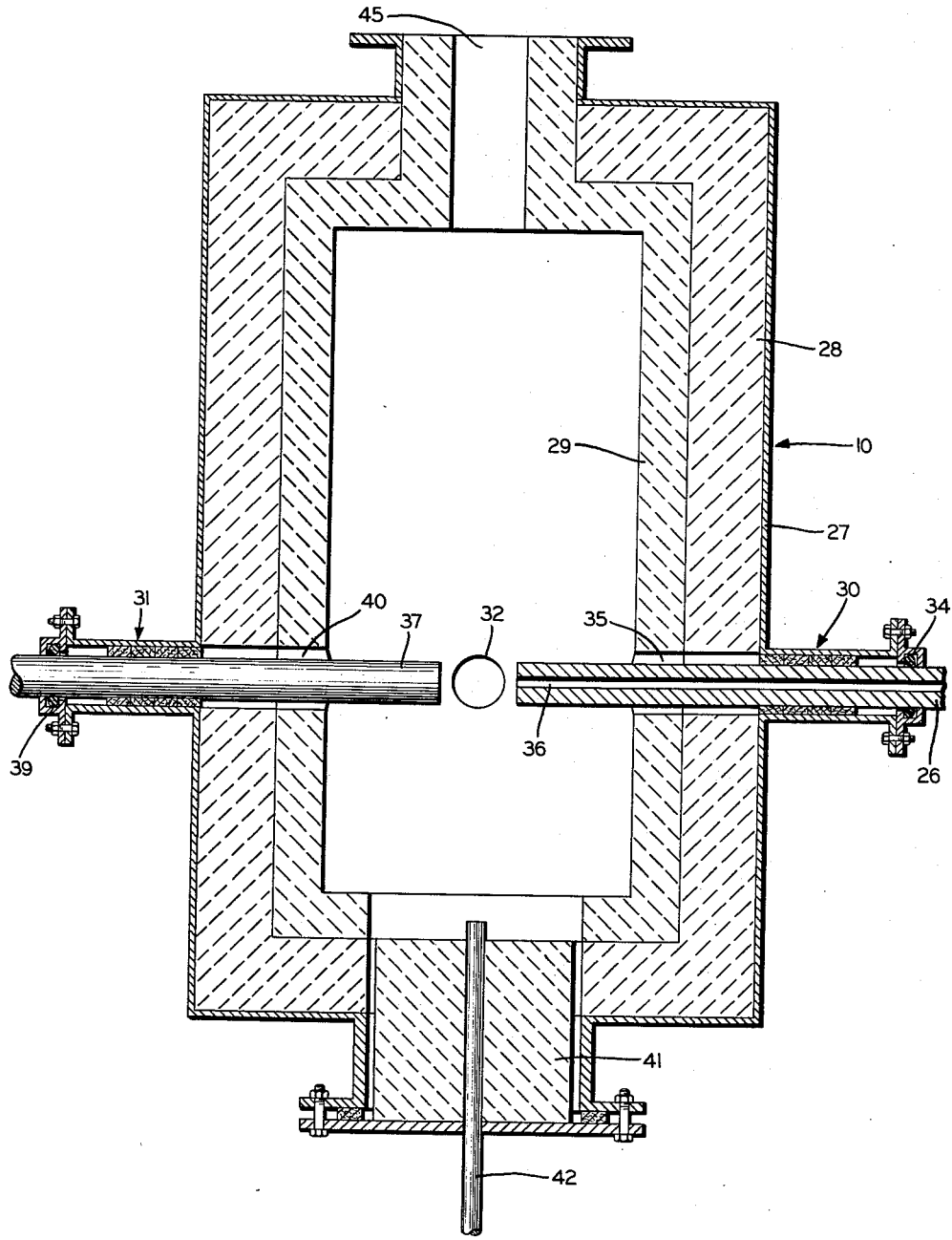
FIG. 2 is a vertical sectional view through the arc furnace showing the hollow anode through the core of which the fluid-solids stream of reactants is fed to the furnace.

As shown in FIG. 2, the arc furnace is a cylindrical vessel comprising the metal shell 27 lined with a relatively thick refractory lining such as "Sil-O-Cel," Johns-Manville's trade name for diatomaceous earth products insulating brick, as indicated at 28 and the relatively thin inner lining of dense alumina brick, as indicated at 29.

The furnace is fitted with two side arc feeder nozzles indicated generally at 30 and 31, set at 180°, and a sight port 32 located at 90° to the arc. The anode 26 is located through the anode feeder 33 and the feeder nozzle 30 provided with O-ring gland 34 and extends through the opening 35 in the furnace shell and insulation toward the center of the furnace.

The anode 26 is provided with the central bore 36 through which the fluid-solids reactants are charged into the furnace. The cathode 37 is located through the cathode feeder 38 and nozzle 31 with O-ring gland 39, and extends through the opening 40 in the furnace shell and insulation lining radially toward the anode 26.

A clean-out nozzle 41 lined with a ceramic insulating plug is provided in the bottom of the furnace and has an air feed pipe 42 located therethrough for admitting air under pressure from a suitable source to the interior of the furnace. Air for supplemental combustion of carbon monoxide may thus be admitted through the bottom nozzle of the furnace.

For this purpose, a compressed air pipe 43 is connected to the air feed pipe 42 in the clean-out nozzle 41. A recording flow control valve 44 is located in the air pipe 43 for regulating the desired amount of air for supplemental combustion of carbon monoxide.

An outlet opening 45, at the top of the furnace, may be connected by pipe 46 to a cyclone 47. Pipe 48 leads from the top of the cyclone 47 to a condenser 49 of usual construction.

In the operation of the process to which the invention pertains, as an example in the chlorination of zirconium oxide for the production of zirconium tetrachloride, zirconium oxide of an average particle size of 20 microns at 85 lbs./ft.$^3$ bulk density, is conveyed continuously from the oxygen hopper 1, by the conveyer 3, to the oxide feed hopper 4.

Simultaneously therewith, furnace-grade carbon of an average particle size of <5 microns at 25 lbs./ft.$^3$ bulk density is conveyed continuously from the carbon hopper 2 by the conveyer 5 to the carbon feed hopper 6.

The powdered zirconium oxide and carbon are metered in proper proportions by the rotary feeders 7 and 8 respectively to the solids feeder leg 14 of the chlorine aspiration system, indicated generally at 9, which aspiration system operates under slight negative pressure at the feed points.

This chlorine aspiration system will add 110% of the theoretical chlorine to form a stable gas-solids fluid for addition to the reactor arc furnace 10. The aspiration system requires chlorine under about 60 p.s.i.g. pressure to maintain a stable fluid solids flow.

Approximately two-thirds of the chlorine from the pipe 11 is added at high pressure through the venturi 16, to effect a negative pressure on the solids feeder leg 14, while one-third of the chlorine is added to the feeder leg 14 through the pipe 12 at low pressure to act as a transport agent for the solids feed. The amount and pressure of the chlorine admitted to the solids feeder leg and to the venturi are controlled by the valves 13 and 15.

The fluidized reactants after passing through the feeder 16 are introduced into the furnace through the hollow anode 26. In actual operation the anode 26 and cathode 37 will be graphite electrodes, say of about 4" diameter operating at 250 amps./in.$^2$ current density with a total maximum power input of 75 kw. The bore 36 in the anode is preferably about 1" diameter. Electric power for the electrodes will be direct current supplied by a 75 kw. rectifier source.

The cathode 37 will be fed through the cathode feeder 38, set at a fixed rate determined by electrode erosion, while the feed of the anode 26, through the anode feeder 33, will be maintained by voltage control.

At the proposed current load, the arc will operate at near maximum of the low density range, at which point electrode erosion is minimum while maintaining good arc stability. The feed input of the arc is equivalent to that necessary to heat the reactants to 1650° F., at which point the chlorination reaction becomes exothermic. The reaction becomes a flame-type reaction with the arc as the source and igniter.

The reaction products of this reaction consist of carbon monoxide and zirconium tetrachloride. In order to avoid heat loss from the reaction flame by radiation, the operation is conducted in an air atmosphere which provides somewhat less than stoichiometric oxygen for combustion.

For this purpose, air is admitted at the lower portion of the furnace through the air feed pipe 42. In this manner the product carbon monoxide will be combusted and the heat of this reaction will provide a confining hot mantle of gas around the primary chlorination reaction flame. The insulations 28 and 29 in the reactor furnace will be adapted to yield a final gas temperature of about 800° F. with the stoichiometric amount of air to complete CO combustion.

This process differs from the prior practice in that the reactants are introduced in finely particulated form with chlorine through the core of the electrode while the arc is operating in the low intensity region where electrode consumption is slow, as distinguished from "high intensity" arc operation as described in Sheer Patent No. 2,616,843.

The arc is operated in a low anode erosion rate condition, and the voltage is preferably so regulated that the arc is operated just below the incipient point of high anode erosion, and the electrode carbon is not a component part of the reaction but serves only as an instrument for providing the necessary heat to bring the reactants to a proper thermodynamic heat level.

The heat of reaction of the above reaction is positive above 1650° F., therefore, if the reactants are heated to 1650° F. reaction will proceed exothermically. A 10% excess of chlorine should be sufficient to convert all zirconium values to the chloride. A limited amount of oxygen is made available to combust a portion of the CO to give $CO_2$ thus providing additional heat to balance the heat losses from the reaction vessel, while at the same time not providing an oxidizing atmosphere capable of degrading the desired $ZrCl_4$ reaction product.

The arc design is planned to add the requisite heat necessary to bring the reactants to 1650° F. by arc heat, although in practice a considerable amount of requisite heat may be supplied by the supplemental combustion of CO to $CO_2$ with addition of oxygen with the reactants or after reaction.

The furnace volume provides minimum surface area to reduce heat loss and yet yield combustion products at a temperature near 800° F. Additional air is added to combust a portion of the available CO to $CO_2$. The electrodes are preferably 4" diameter, and the reactants are fed through a 1" diameter bore in the anode.

The aspiration type continuous feeder is designed for fluidizing the solids at the following rate:

7.33 lbs./min. of 80 lb./ft.$^3$ $ZrO_2$
1.43 lbs./min. of 25 lb./ft.$^3$ carbon
9.35 lbs./min. of chlorine gas under pressure At this rate, 18,000 lbs. of $ZrCl_4$ may be produced in a day, or substantially 6,000,000 lbs. in a year.

The gaseous reactor products from the arc furnace are withdrawn from the top of the furnace through the pipe 46 and passed through the cyclone 47 and into the condenser 49 for collection, as in usual practice.

In the operation of this process the chlorine efficiency and the percent of conversion of zirconium oxide to zirconium tetrachloride is considerably increased over present practice. The chlorine efficiency under this process will be from 80–98% as compared with an average of 60% chlorine efficiency with the briquette process. The percent of conversion of oxides to chlorides under this process will be from 80–98%.

Although the invention is described specifically for the conversion of zirconium oxide to zirconium tetrachloride, it is also applicable for the preparation of volatile chlorides from other oxides and the like. For instance, beryllium chloride may be obtained by the above process from powdered beryl ore ($3BeO.Al_2O_3.6SiO_2$).

In this case the reaction in the arc furnace would produce silicon tetrachloride having a boiling point of 58° C., aluminum chloride having a boiling point of 177.8° C. and beryllium chloride having a boiling point of 520° C.

The silicon tetrachloride and aluminum chloride, having the lower boiling points, can be readily fractionated away from the beryllium chloride which is the desired raw material to be converted by electrolysis to beryllium metal.

As another example, tantalite or columbite (FeMn)(CoTa)$O_3$) in powdered form could be fed into the apparatus as above described. The reaction in the arc furnace would produce ferric chloride having a boiling point of 315° C., manganese chloride having a boiling point of 1190° C., tantalum pentachloride having a boiling point of 242° C. and columbium pentachloride having a boiling point of 240.5° C.

The mixed tantalum and columbium chlorides can be readily fractionated from the iron and manganese chlorides having the higher boiling points, thus separating the raw material which is suitable for fractional crystallization or solvent extraction to separate the tantalum and columbium.

From the above it will be obvious that the herein-described invention provides a novel and efficient process and apparatus for converting oxides to chlorides which provides for a considerable increase in chlorine efficiency and percentage of conversion, as compared with the prior art briquette-chlorination process, and which eliminates the disadvantages and difficulties of prior practice.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. The process of converting an oxide to a volatile chloride, which consists in mixing a finely particulated oxide and finely particulated carbon, aspirating the mixture with chlorine gas under pressure to form a fluid-solids flow, and discharging the fluid-solids flow into an electric arc operated at near maximum of the low intensity range.

2. The process of converting an oxide to a volatile chloride, which consists in mixing a finely particulated oxide and finely particulated carbon, aspirating the mixture with chlorine gas under pressure to form a fluid-solids flow, and discharging the fluid-solids flow through a hollow anode into the arc of an arc furnace operated at near maximum of the low intensity range.

3. The process of converting an oxide to a volatile chloride, which consists in mixing a finely particulated oxide and finely particulated carbon, aspirating the mixture with chlorine gas under pressure to form a fluid-solids flow, and discharging the fluid-solids flow into an electric arc in the presence of sufficient air to effect partial combustion of $CO$ to $CO_2$.

4. The process of converting an oxide to a volatile chloride, which consists in mixing a finely particulated oxide and finely particulated carbon, aspirating the mixture with chlorine gas under pressure to form a fluid-solids flow, and discharging the fluid-solids flow through a hollow anode into the arc of an arc furnace in the presence of sufficient air to effect partial combustion of $CO$ to $CO_2$.

5. The process of converting an oxide to a volatile chloride, which consists in mixing a finely particulated oxide and finely particulated carbon, feeding the mixture into a venturi, and passing chlorine gas under pressure through the venturi to form a fluid-solids flow and to discharge the fluid-solids flow into an electric arc.

6. The process of converting an oxide to a volatile chloride, which consists in mixing a finely particulated oxide and finely particulated carbon, feeding the mixture into a venturi, and passing chlorine gas under pressure through the venturi to form a fluid-solids flow and to discharge the fluid-solids flow into an electric arc operated at near maximum of the low temperature range, in the presence of sufficient air to effect partial combustion of $CO$ to $CO_2$.

7. The process of converting $ZrO_2$ to $ZrCl_4$, which consists in mixing finely particulated $ZrO_2$ and finely particulated C, aspirating the mixture with chlorine gas under pressure to form a fluid-solids flow, and discharging the fluid-solids flow into an electric arc.

8. Apparatus comprising an arc furnace, a cathode and a hollow anode in said furnace for producing an arc therein, an aspiration system including a venturi and a solids feeder leg communicating with the venturi, means for feeding powdered material through the solids feeder leg into the venturi, and means for passing gas under pressure through the venturi for discharging the powdered material through said hollow anode into the arc.

9. Apparatus comprising an arc furnace, a cathode and a hollow anode in said furnace for producing an arc therein, an aspiration system including a venturi and a solids feeder leg communicating with the venturi, low pressure chlorine gas means for feeding powdered material through the solids feeder leg into the venturi, and high pressure gas means for discharging the powdered material from the venturi through said hollow anode into the arc.

References Cited in the file of this patent

UNITED STATES PATENTS 2,555,507    Pratt _____ June 5, 1951
2,617,761    Sheer et al. _____ Nov. 11, 1952